US006856053B2

(12) United States Patent
LeFlem et al.

(10) Patent No.: US 6,856,053 B2
(45) Date of Patent: Feb. 15, 2005

(54) COOLING OF ELECTRICAL MACHINES

(75) Inventors: Graham LeFlem, Rugby (GB); Clive D. Lewis, Rugby (GB); Joseph Eugene, Rugby (GB)

(73) Assignee: Alstom, Paris (FR)

( * ) Notice: Subject to any disclaimer, the term of this patent is extended or adjusted under 35 U.S.C. 154(b) by 231 days.

(21) Appl. No.: 10/128,643

(22) Filed: Apr. 19, 2002

(65) Prior Publication Data

US 2002/0180284 A1 Dec. 5, 2002

(30) Foreign Application Priority Data

Apr. 20, 2001 (GB) .............................................. 0109692
Jun. 27, 2001 (GB) .............................................. 0115687

(51) Int. Cl.[7] ................................................. H02K 3/24
(52) U.S. Cl. .......................... 310/54; 310/194; 310/254
(58) Field of Search ........................ 310/54, 194, 60 A, 310/254, 258, 259, 201, 195–196, 180, 208

(56) References Cited

U.S. PATENT DOCUMENTS

| 2,217,430 A | * | 10/1940 | Baudry .......................... 310/54 |
| 2,722,616 A | * | 11/1955 | Moses .......................... 310/54 |
| 2,821,641 A | * | 1/1958 | Ringland ..................... 310/213 |
| 2,898,484 A | * | 8/1959 | Krastchew ................... 310/52 |
| 3,014,139 A | * | 12/1961 | Shildneck ..................... 310/64 |
| 3,249,775 A | | 5/1966 | Baylac |
| 3,681,628 A | * | 8/1972 | Krastchew ................... 310/54 |
| 3,963,950 A | * | 6/1976 | Watanabe et al. ............. 310/54 |
| 4,117,358 A | * | 9/1978 | Flick ........................... 310/59 |
| 4,228,375 A | | 10/1980 | Beermann et al. |
| 4,318,021 A | * | 3/1982 | Johansson et al. .......... 310/260 |
| 4,345,175 A | | 8/1982 | Jones |
| 4,380,713 A | | 4/1983 | Roger et al. |
| 4,384,227 A | * | 5/1983 | Kawai .......................... 310/213 |
| 5,323,079 A | * | 6/1994 | Nieves et al. ................ 310/213 |
| 5,408,152 A | * | 4/1995 | Finnerty et al. .............. 310/54 |
| 6,313,556 B1 | * | 11/2001 | Dombrovski et al. .......... 310/91 |
| 6,661,124 B1 | * | 12/2003 | Seki et al. ..................... 310/12 |

FOREIGN PATENT DOCUMENTS

| BE | 369 009 A | 4/1930 |
| DE | 283 698 C | 4/1915 |
| DE | 295 610 C | 12/1916 |
| DE | 499 422 C | 6/1930 |
| DE | 574 962 C | 4/1933 |
| DE | 30 03 483 A | 8/1980 |
| EP | 0 225 132 A1 | 8/1987 |
| EP | 392243 | * 10/1990 ............ H02K/3/24 |
| EP | 414927 | * 3/1991 |
| FR | 1 531 025 A | 6/1968 |
| GB | 252335 | 9/1926 |
| JP | 59089569 | 11/1982 |
| JP | 59 089569 A | 5/1984 |
| JP | 61 227647 | 10/1986 |

* cited by examiner

Primary Examiner—Burton Mullins
(74) Attorney, Agent, or Firm—Kirschstein, et al.

(57) ABSTRACT

A stator for a high power density air gap electrical machine comprises an outer annular laminated iron stator core and a stator winding comprising a plurality of coils having linear conductor portions extending substantially parallel to a longitudinal axis of the machine. Support teeth for the coils are fabricated from a non-magnetic material, with each support being interposed between two adjacent ones of the linear conductor portions of the coils. The supports not only supplement the mechanical strength of the winding but also define channels for the flow of coolant to extract heat from the coils.

25 Claims, 3 Drawing Sheets

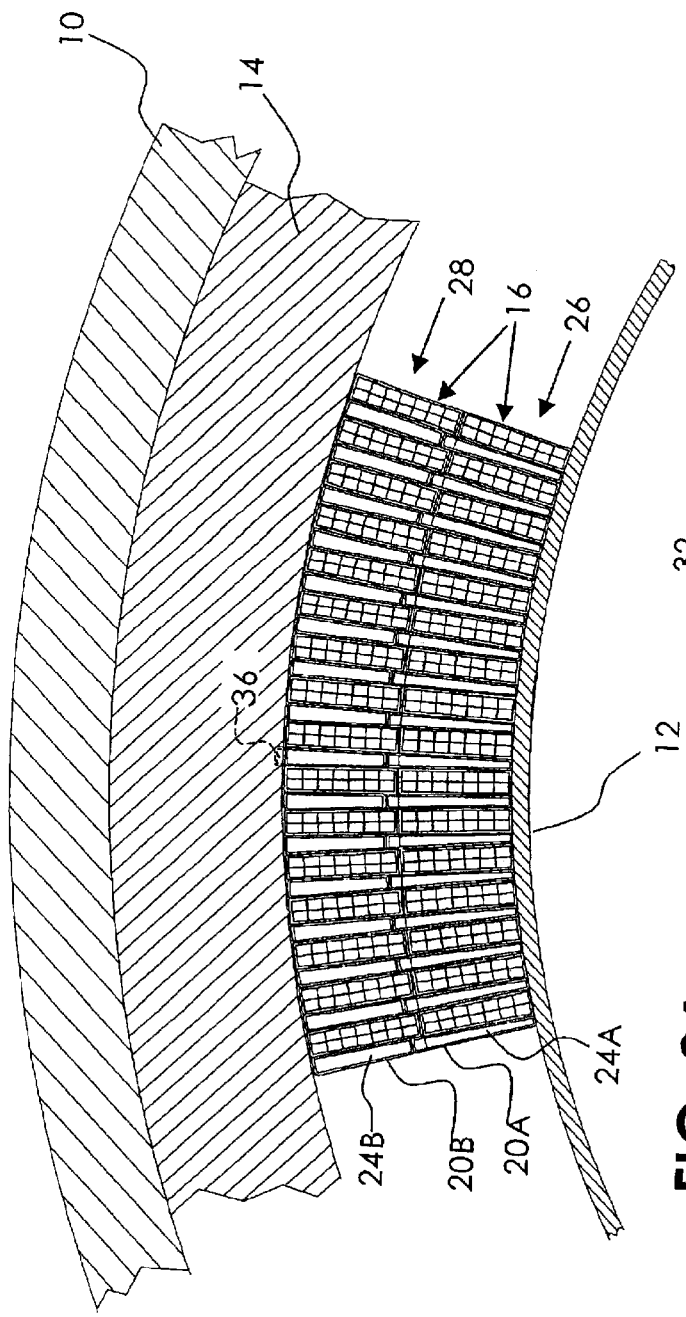
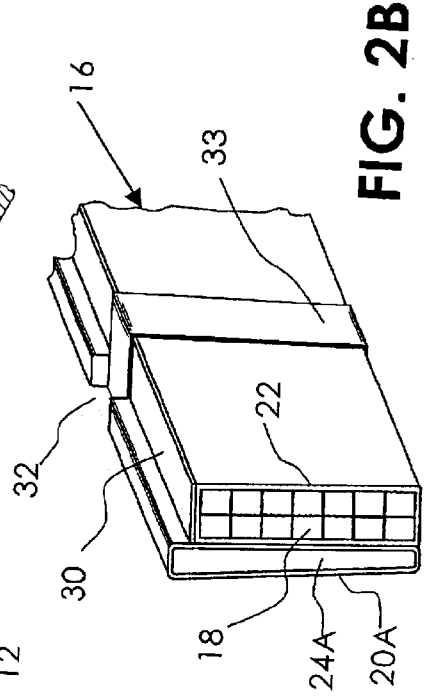
FIG. 2A
FIG. 2B

COOLING OF ELECTRICAL MACHINES

FIELD OF THE INVENTION

This invention relates to cooling of electrical machines, and in particular, but not exclusively, to the cooling of stators in induction machines that produce a high magnetic flux density.

BACKGROUND OF THE INVENTION

Induction machines have been known for well over a century. Usually such machines comprise a generally cylindrical central rotor and an outer annular stator, although linear machines are also known. Further, it is usual for the conductor coils or windings, which extend longitudinally of the stator, to be wound into slots provided in a laminated iron stator core in order to enhance the flux produced by the stator windings, i.e., the stator windings pass between laminated iron "teeth" defined by the sides of the slots. However, in machines whose windings are able to produce very high flux densities (say, in excess of 1.5 Tesla at the air gap between the rotor and the stator), the use of iron stator teeth becomes undesirable, due to increased reactance and higher iron losses resulting from magnetic saturation of the stator teeth. Consequently, in such machines the iron teeth are conveniently replaced by non-magnetic teeth for support of the stator windings. The air gap between the periphery of the rotor and the beginning of the iron stator core now effectively extends to the bottom of the stator slots. Because the stator winding is fully within this air gap, this type of construction, to which the present invention particularly relates, is known as an "air gap winding".

Some form of cooling of the stators of such machines is of course required. In general, cooling of stators of induction machines is a well known problem which has been solved in various ways, e.g., by means of cooling passages extending axially and/or radially through the stator. International Publication No. WO 01/17094 A1, for example, shows radial cooling air passages provided between adjacent stacks of toothed laminations in an iron stator core.

However, such high flux densities as that quoted above enables design of much smaller machines having higher power densities, which results in greater generation of heat within the stator windings, but at the same time a much reduced surface area for cooling. This necessitates a more efficient cooling system than known arrangements can provide, in order to prolong the life of the machine.

SUMMARY OF THE INVENTION

It is an object of this invention to provide an air gap stator winding in a high power density electrical machine with good cooling combined with good structural support of the winding.

According to a first aspect of the invention there is provided a stator for an air gap electrical machine. The stator comprises an outer annular laminated stator core coaxial with a longitudinal axis of the machine, a stator winding inside the stator core and comprising a plurality of coils having linear conductor portions, and a plurality of supports for the coils, the supports extending alongside the linear conductor portions of the coils. The supports are fabricated from a non-magnetic material and each support is interposed between, and in contact with, two adjacent linear conductor portions of the coils, at least some of the supports defining channels for flow of coolant therealong, thereby to extract heat from the coils.

Such a structure is advantageous because it provides efficient use of space within the stator, in that the cross-sectional area of the support that is not required for support of the winding can be utilized for the transport of coolant.

Preferably, all the supports define channels for the flow of coolant, and the non-magnetic material from which they are fabricated is non-metallic, e.g., fiber-reinforced plastic.

The linear conductor portions of the coils run substantially parallel to the longitudinal axis of the machine, the supports providing support for the coils for substantially all of the linear conductor portions of the coils, cooling of the coils thereby being provided for substantially their entire linear conductor portions.

The coolant flow channels may be defined either internally or externally of the supports. If the channels are inside the supports, the supports may conveniently comprise hollow shells whose walls form the boundaries of the channel, heat thereby being conducted from the coils, through the walls and into the coolant flowing therethrough. However, it is preferred that the channels are defined on the outsides of the supports, between the external surfaces of the supports and the external surfaces of the coils, so that heat can be transferred directly from the coils into the coolant without passing through an intermediate wall.

In one variant of the invention, the linear conductor portions of the coils are supported from the supports through spacers provided between the supports and the linear conductor portions, the coolant channels thereby being defined between confronting faces of the linear conductor portions of the coils and the supports.

However, we have found that the best way of defining the coolant flow channels is by forming each coil-contacting surface of the support with at least one depression therein, the depression extending longitudinally of the support, the boundaries of the coolant flow channels thereby being defined by the depressed parts of the external surfaces of the supports and the external surfaces of the coils. Preferably, at least two such channels are defined between each linear conductor portion and each adjacent support. To avoid over-stressing the supports, it is preferred that the depressions in the coil-contacting surfaces of the supports are of smoothly curved concave form when seen in a section which is transverse of their longitudinal extents.

Preferably, coolant inlet and outlet manifolds communicate with respective axially opposed ends of the channels to facilitate flow of coolant through the channels.

The coils include end windings to connect the linear conductor portions of the coils to each other, the end windings lying in the inlet and outlet manifolds so that the same cooling fluid is used to cool both the end windings and the linear conductor portions.

In preferred embodiments, the stator winding comprises two layers or tiers, these being respectively a radially inner layer and a radially outer layer of the linear conductor portions of the coils. In this type of winding, the end-windings comprise connections between the two layers. To provide mechanical strength to react torque forces generated by the machine, the two layers may be keyed together at a castellated interface between the two layers. The castellations may comprise supports having differing radial extents such that at least some of the supports in at least one of the layers extend between the linear conductor portions of the coils in the adjacent layer. Additionally, or alternatively, the stator winding may be keyed to the stator core at a castellated interface therebetween by the expedient of making the radially outer ends of some or all of the supports adjacent the core extend radially beyond the linear conductor portions of the coils into matching axially extending grooves provided in the stator core.

The linear conductor portions of the coils may be provided by rectangular bundles of conductors, the rectangular bundles having their major dimensions extending in the radial direction. Within the bundles, the conductors may also be rectangular and are preferably formed from small diameter wires, the wires being insulated from each other within the conductors.

According to a second aspect of the invention there is provided an electric motor or generator having a stator according to the first aspect of the invention.

According to a third aspect of the invention there is provided a method of cooling an air gap electrical machine, comprising the step of passing coolant through channels at least partly defined by non-magnetic material supports located between, and in contact with, adjacent linear conductor portions of coils comprising a stator winding of the machine. A further step comprises passing the coolant over end-windings of the stator winding before and after passing the coolant through the channels.

BRIEF DESCRIPTION OF THE DRAWINGS

There now follows, by way of example only, a description of embodiments of the invention with reference to the accompanying drawings, in which:

FIG. 2A shows a view of part of a cross-section taken on line A—A of FIG. 1;

FIG. 2B is a perspective view of a detail of the section shown in FIG. 2A;

DETAILED DESCRIPTION OF THE PREFERRED EMBODIMENTS

Figure 1:
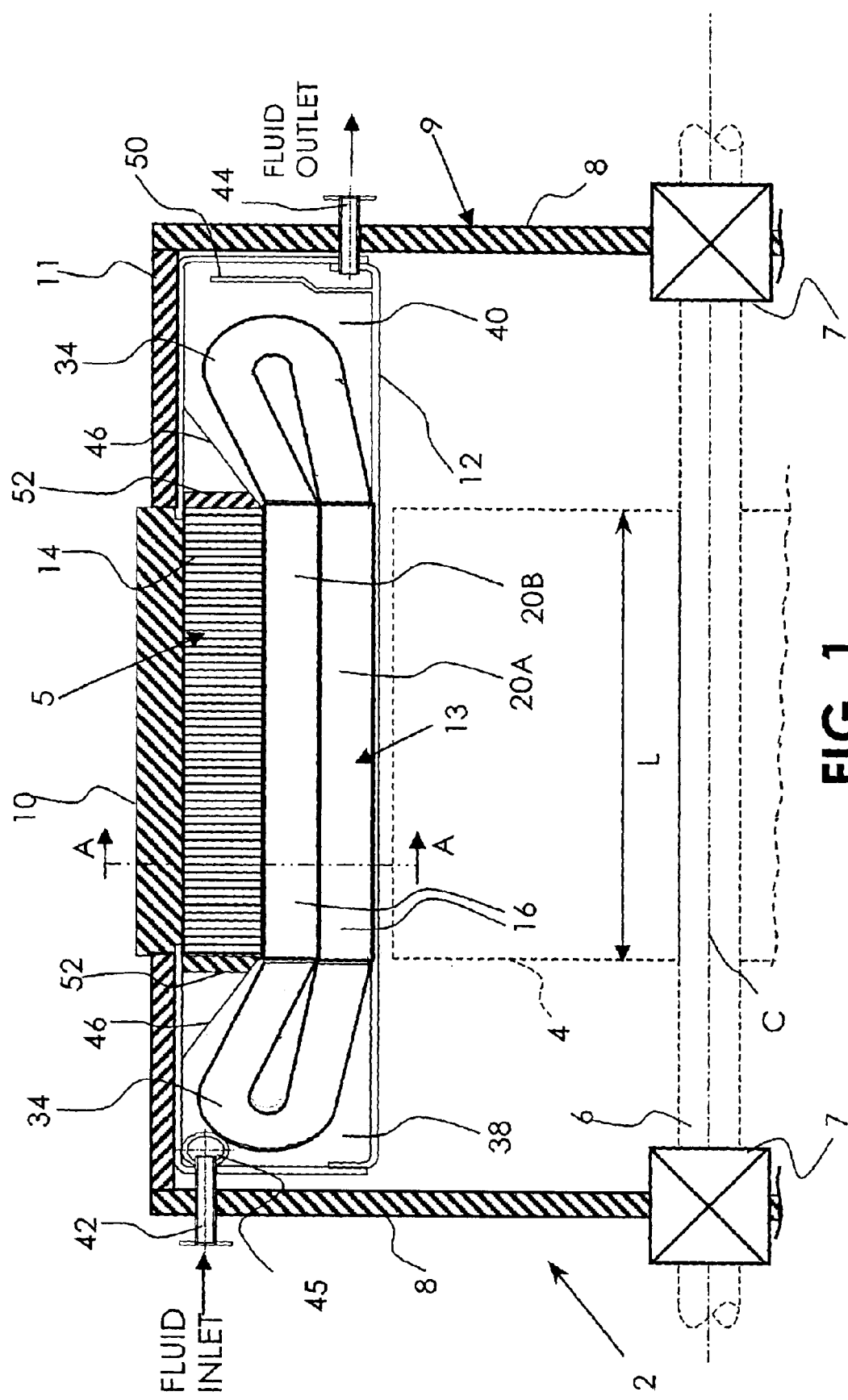
FIG. 1 shows a partial longitudinal section through an air gap induction machine according to a first embodiment of the present invention.

The electric motor 2 shown in FIG. 1 comprises an inner rotor 4, indicated diagrammatically by dotted lines, and an outer stator 5. Rotor 4 is mounted fixedly on a shaft 6 held for rotation on an axial centerline C by bearings 7, which are supported by end walls 8 of a machine enclosure 9. Stator 5 is held within an external cylindrical stator frame 10, which in turn is part of a generally cylindrical side wall 11 of enclosure 9.

Within the machine enclosure 9, an annular fluid-tight tank 12 encloses the stator 5 and partitions the rotor 4 from the stator. The stator itself comprises a winding 13 comprising a number of coils and a laminated iron core 14, the laminations being depicted diagrammatically by vertical hatch lines. The coils in the winding 13 are connected to an electrical supply (not shown) for generation of an electromagnetic field which interacts with the rotor 4 to rotate it and produce a useful torque output on the shaft 6.

Although the winding 13 is mounted inside the iron core 14, there is no magnetic material extending between circumferentially adjacent turns of the winding, i.e., for the reasons advanced above in the Background of the Invention, the winding 13 is an air gap winding. As best seen in FIGS. 2A and 2B, the turns of the winding comprise large bundles 16 of conductors 18, each bundle 6 having a layer of insulation 2 around its circumference and a substantially rectangular cross-section which is elongate in the radial direction. In this particular example, each conductor bundle 16 consists of fourteen conductors 18, arranged in two columns of seven, but more or less conductors may be used, as required by any particular rating of the machine. Conductors 18 are also of substantially rectangular or square cross-section (though alternative shapes are possible), each conductor being insulated from the other conductors 18 within the bundle 16 to minimize the formation of eddy currents, which would decrease the efficiency of the machine 2. Insulation of the conductor bundles 16, and of the conductors 18 within the bundles, can be accomplished by the usual means known in the industry, for example, by wrapping with glass fiber tape or the like.

Because the air gap winding arrangement causes almost all the magnetic flux to pass through the stator winding conductors 18, it is also necessary to minimize the induction of eddy currents within the conductors themselves, which would otherwise flow around the conductor cross-section. Such eddy currents are minimized by forming each conductor 18 out of a large number of small diameter (say, 1 mm) strands, each strand being coated with a lacquer to insulate it from neighboring strands, as known in the industry.

In the present embodiment, the entire stator winding 13 consists of a large number of individual conductor coils. The coils are constituted by the conductor bundles 16, each coil having fourteen turns arranged in two tiers or layers 26, 28, each layer comprising the above-mentioned two columns of seven conductors. The conductors 18 are linear over their field-generating portion of length L (FIG. 1) where they pass through the air gap between stator core 14 and the rotor 4, but to make each coil (and in so doing to make connections between the layers) it is necessary to join the ends of the straight parts of the conductors together by means of loops called end-windings 34, which project axially substantially beyond the ends of the stator core 14.

After forming and assembly of the conductor coils, including their end-windings, to the final and well-known "diamond" configuration required for the stator winding 13, they are subject to a vacuum pressure impregnation and curing process, as also well known in the industry, to impregnate them throughout (including between the wire strands within conductors 18) with a suitable heat-resistant thermosetting resin. This increases the insulation and mechanical strength of the winding and prevents penetration of the winding by corrosive atmospheric constituents, such as oxygen and water vapor. The vacuum impregnation process may be carried out at the most convenient time during manufacture of the machine, as exemplified below.

An insulating spacer layer 30 is inserted between radially adjacent conductor bundles 16 during assembly of the stator winding to provide a clearance between the layers 26, 28 and thereby allow for a greater thickness of insulation at the transition between the straight portions of the coils and the end windings 34.

As will further be seen from FIGS. 2A and 2B, the conductor bundles 16 in their two layers 26 and 28 are held in position and supported by a number of non-magnetic support "teeth" or struts 20A, 20B, respectively, which replace the laminated iron "teeth" between which stator windings would normally be held in a machine having a lesser magnetic flux density. As will be appreciated from the figures, the conductor bundles 16 and their supports 20A, 20B extend axially, lying substantially parallel to the longitudinal axis C.

Because winding 13 is an air gap winding, the conductor bundles 16 must be able to able to react the torque created by the interaction of the electro-magnetic fields of the rotor and stator. The supports 20A, 20B therefore supplement the mechanical strength of the resin-impregnated winding.

As will be seen from FIG. 2A, the conductor bundles 16 in layer 26 are in radial and axial alignment with the conductor bundles in layer 28 and the supports 20A in layer 26 and 20B in layer 28 are likewise in radial and axial alignment with each other. However, the conductor bundles 16 in each layer 26, 28 have rectangular sections and also have the same dimensions, and therefore to effect intimate contact between the supports 20A, 20B and the conductor bundles 16 over the radial extent of the stator winding, it is necessary for the supports to taper in the radial direction from a maximum width at the radially outer circumference of the stator winding to a minimum width at the radially inner circumference of the stator winding. This accommodates the increased circumferential spacing between adjacent conductor bundles at the radially outer circumference of the stator winding relative to their spacing at its inner circumference.

It should be noticed that the supports 20A in the inner layer 26 are radially longer than the conductor bundles 16 by a certain amount, whereas the supports 20B in the outermost layer 28 are radially shorter than the conductor bundles 16 by the same amount. The supports 20A in layer 26 therefore extend radially outwards between the field-generating portions of the coils in the adjacent layer 28. Therefore, as seen in radial section, the interface region between layers 26 and 28 has a castellated appearance. In this way the two layers 26, 28 are keyed together or interlocked to react the induced rotor torque more effectively. The skilled person will of course realize that variations in this interlocking design are possible. For instance, layer 26 could be provided with the radially shorter supports and layer 28 could have the radially longer ones, or radially longer and shorter supports could be alternated in both layers in complementary fashion to produce a two-step castellation. Alternatively, only selected of the supports in either row could be made radially longer or shorter than the conductor bundles, the other supports being the same radial length as the bundles. As a further alternative, it may be possible to produce a non-magnetic two-layer stator core structure of adequate strength without having a castellated interface between the two layers. In this case, all the supports in the two layers could have the same radial extent as their adjacent conductor bundles, and the core structure would simply rely on the strength of, e.g., a thermosetting resin or other high temperature adhesive bond at the interface between the two layers.

Yet another stator winding strengthening feature of the illustrated embodiment is shown in FIG. 2A. As shown by the dashed lines, it would be possible to make the radially outer end 36 of some or all of supports 20B extend radially outwards into matching axially extending grooves provided in the inner surface of the stator core 14, thereby providing an interlocked castellated interface between stator winding 13 and stator core 14 for reaction of the induced rotor torque.

Due to its high power density, the physical size of the illustrated machine is smaller than machines of lower power density with the same rating. Consequently, there is a reduced surface area for cooling. The invention makes use of the absence of magnetic iron teeth to provide an efficient stator cooling system. Because the stator support teeth or struts 20A, 20B are needed only to separate and support the coils, the supports can be made in the form of hollow shells as shown in FIGS. 2A and 2B, the supports being open at axially opposed ends of the stator, thereby creating axially extending open-ended channels 24 along and through which a cooling medium can pass. It is preferred that the supports 20A and 20B are made of a suitable glass-fiber (or perhaps graphite-fiber) reinforced composite material. A suitable wall thickness for the supports is of the order of 2 mm. The supports may be fabricated from a glass-reinforced composite material. Alternatively, the supports may be fabricated from a non-magnetic material that is also a good thermal conductor. However, this is not essential because the surface area of the supports through which heat transfer can occur can be made large enough to provide sufficient cooling.

As seen in FIG. 1, the tank 12 which encloses the stator 5 is divided by the stator into a coolant inlet manifold 38 and a coolant outlet manifold 40. The end windings 34 extend into the manifolds. A coolant inlet 42 is provided at a top or radially outer region of the inlet manifold 38 and a coolant outlet 44 is provided at a bottom or radially inner region of the outlet manifold 40. To ensure an equal cooling effect over all parts of the end windings 34 in the inlet manifold 38, coolant from inlet 42 enters the inlet manifold via a toroidal ring 45 which extends around the internal circumference of the manifold. The wall of toroid 45 has a large number of holes therethrough, the holes being spaced around the internal circumference of the manifold so that coolant is evenly distributed over the end windings. Baffles 46 are provided to prevent flow stagnation in the corners of the inlet and outlet manifolds and to smooth the flow of coolant into and out of the stator coolant channels 24A, 24B provided by the supports 20A, 20B. A further baffle or weir 50 is provided to ensure the end-windings 34 are fully immersed in the coolant as it flows past them to cool them by direct contact with their external insulation.

In use, a coolant, in this case an inert insulating liquid coolant is pumped into in the inlet manifold 38 via the liquid inlet 42. A preferred coolant is Midel 7131™, which is manufactured by M&I Materials Ltd. This fluid is normally used for transformer cooling and has a specific heat capacity of 2100 $Jkg^{-1}K^{-1}$, about half that of water. An inert coolant is preferred to water because of the inherent corrosion and electrical risks associated with water. The pressure created by the pumping causes the liquid to flow through the supports 20A, 20B to the outlet manifold 40. As the liquid passes through the supports 20 heat transfer occurs and heat is removed from the conductors 18 within the conductor bundles 16. Thus, the conductors are cooled. Once the liquid has reached the outlet manifold it passes over the weir 50 and is pumped out of the liquid outlet 44. It is then cooled in a suitable heat exchanger before being passed to the liquid inlet 42 to restart the cycle.

By cooling in accordance with the invention to maintain a low temperature in the stator winding, electrical efficiency is increased since losses in the winding will be reduced due to the lower resistivity of copper at lower temperatures.

Alternative coolants may be used if desired, if the cooling duty to be performed by them is matched to their cooling capacities, e.g., pressurized air, or other gases, or water.

Alternative designs of cooling channel may be used, e.g., the supports 20A, 20B may be closed at their ends instead of open and narrow channels (again open at both ends of the stator to communicate with the coolant inlet and outlet manifolds) may be created at the interfaces of the conductor bundles and the supports by inserting axially extending spacer strips therebetween. Consequently, the coolant would make direct contact with the outer insulation of the conductor bundles 16, facilitating more efficient cooling of the stator winding.

Figure 3:
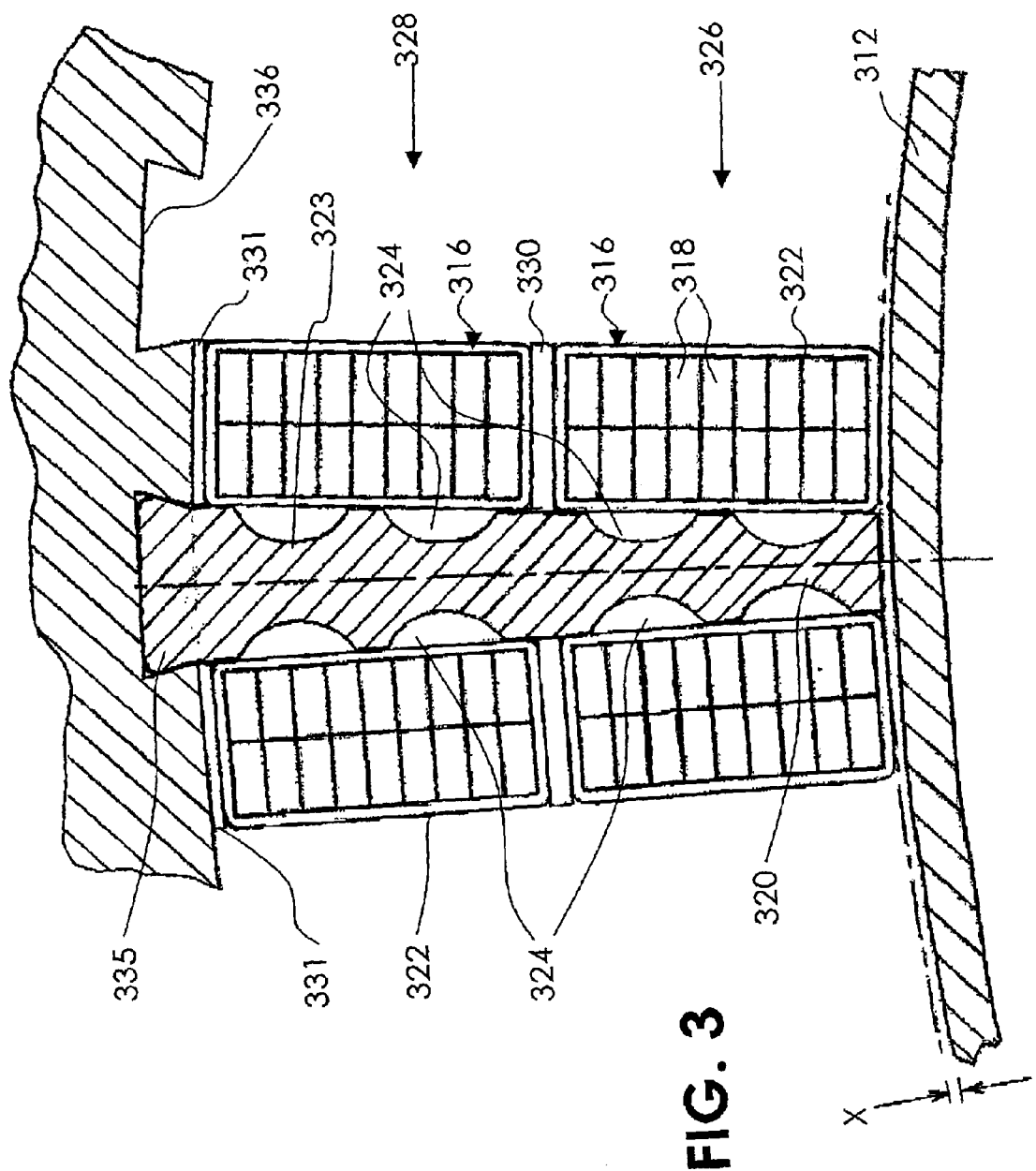
FIG. 3 relates to a second and preferred embodiment of the invention and is a view similar to FIG. 2A but showing a smaller portion of the cross-section in enlarged form.

FIG. 3 illustrates the most preferred embodiment of the invention, which uses the above-mentioned principle of direct contact of the coolant with the outer insulation 322 of the rectangular conductor bundles 316. Once again, the turns of the electrical coils of the stator are arranged in two tiers 326, 328 and the conductors 318 within the bundles 316 are rectangular. The coils/conductor bundles are constructed generally in the same way as for the first embodiment, but this time each bundle consists of eighteen conductors, arranged in two columns of nine, to facilitate the production of higher power than the first embodiment.

Interposed between adjacent coils, and in supportive sealing contact with both tiers of coils, are axially and radially extending support teeth or struts 320, which differ significantly from the support struts of FIGS. 1 and 2.

Firstly, to achieve stiffness and strength, the support struts 320 are of unitary solid construction (though they could have an internal void if such a construction would be sufficiently stiff and strong) and extend without joints or division from the inside circumference of the stator core 314 almost to the inner interior circumference of the annular fluid-tight tank 312 which encloses the stator. In the present case it is envisaged that they are molded from a suitable glass- or graphite-fiber reinforced composite material for reasons of strength and toughness.

Secondly, the radially outer ends of all the support struts 320 are formed as "dovetails" 335 when seen in cross-section and are housed in complementarily shaped grooves or channels 336 which extend axially along the internal diameter of the stator core. This produces a circumferentially stepped or castellated interface between the winding assembly and the core 314 which reacts the torque from the windings and stiffens the winding assembly.

Thirdly, each side of each support strut 320 is provided with molded-in depressions or grooves 323 in the external surfaces of the supports. Together with the external surfaces of the straight conductor portions of the coils, the supports thereby define channels 324 for the flow of coolant therealong in direct contact with the insulation 322 of the conductor bundles. The depressions 323 are shown as having a smoothly curved concave cross-section in the radial direction, rather than having internal corners, to avoid over-stressing any part of the supports 320. In FIG. 3, two channels 324 are defined between each linear conductor portion and each adjacent support, though more or less channels may be provided, as deemed necessary to adequately remove heat from the conductor bundles.

To allow for thermal expansion of the tiers 326, 326 of the stator coils during operation of the machine at high power, a small clearance X, of the order of one to two millimeters, is provided between the outer circumference of the tank 312 and the radially inner circumference of the stator winding assembly. Insulating spacers 330 are provided between the two tiers 326, 328 of the winding and further insulating spacers 331 are provided between the radially outer tier 328 and the stator core 314.

Referring again to FIGS. 1 and 2, assembly of the stator 5 of this embodiment from its component parts will be described and in this connection a further feature should be noted from FIG. 2B. To aid joining of the conductor bundles 16 to their supports 20A during assembly of the stator winding, and to increase the strength of the assembled winding, the supports 20A are provided with notches or recesses 32 at several equally spaced locations along their axial lengths. At these locations, the recesses reduce the radial dimension of the supports 20A to that of the circumferentially adjacent conductor bundle 16, so facilitating wrapping of glass fiber tape 33 or the like around both items to bind them together. The inner layer of supports 20A can be taped to their conductor bundles before the conductor bundles are assembled with their end-windings to form the coils. Once this has been done, the outer layer of supports 20B can be slid into place. It will of course be understood that the supports 20A, 20B and the coils of the stator winding 13 in their two layers are assembled together to form a stator winding assembly before the winding is united with the stator core 14 to produce the complete stator 5.

On the other hand, the preferred stator winding assembly of FIG. 3 can be produced by simply assembling the coils and then sliding the supports 320 into place between the conductors 316.

The rest of the assembly process is the same for the embodiments of both FIGS. 2 and 3, but will be described by identifying the reference numerals of FIG. 1 only. Once having fully assembled the stator winding 13, the laminated stator core 14 is built around it. The laminations comprise thin (say, less than 1 mm thick) low loss electrical sheet steel pre-coated with insulation on both sides. The laminations are manufactured as segments of rings and formed into a number of packs of laminations, these being assembled onto the stator winding 13 to form full rings. The core is held together by welding heated tie bars (not shown) down the backs of the laminations. These tie bars are then welded to a steel compression plate annulus 52 provided at each axially opposed end of the stator core. The tie bars contract when cool and act as springs to maintain full contact between the laminations over the life of the machine.

Once the stator core has been assembled onto the completed stator winding, the entire stator 5 is then passed through the vacuum pressure resin impregnation and curing process which completes the stator winding insulation process and bonds the stator assembly together. Subsequently, the stator enclosure 12 can be built around the stator 5.

Although the illustrated embodiments of the invention have a winding in which the coils occupy two layers, the skilled person will realize that it is possible to provide a winding which has only one layer. Such a single layer winding could potentially give a higher specific power output. However, if high phase and pole numbers are to be used, as is desirable for enhanced flexibility and control of the machine, the end winding interconnections for a single layer winding would become too bulky, resulting in an increase in the overall machine diameter.

Although the illustrated embodiment particularly relates to an electric motor, the stator construction described could also be applied to generators.

It will be understood that each of the elements described above, or two or more together, also may find a useful application in other types of constructions differing from the types described above.

While the invention has been illustrated and described as embodied in the cooling of electrical machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of cooling a stator of an air gap electrical machine, comprising the steps of: passing a coolant through channels at least partly defined by non-magnetic material supports located between, and in contact with, adjacent linear conductor portions of coils comprising a stator winding of the machine and defining the channels externally of the supports.

2. The method according to claim 1, further comprising the step of passing the coolant over end-windings of the stator winding before and after the coolant is passed through the channels.

3. A stator for an air gap electrical machine, the stator comprising:
   a) an outer annular laminated stator core coaxial with a longitudinal axis of the machine,
   b) a stator winding inside the stator core and comprising a plurality of coils having linear conductor portions extending parallel to the longitudinal axis and stacked radially of the longitudinal axis, and
   c) a plurality of supports for the coils, the supports extending along the longitudinal axis alongside the linear conductor portions of the coils, the supports also tapering radially of the longitudinal axis to make intimate contact with the stacked linear conductor portions, the supports being fabricated from a non-magnetic material, and each support being interposed between, and in contact with, two adjacent ones of the linear conductor portions of the coils, at least some of the supports defining channels extending along the longitudinal axis for a flow of a coolant therealong, thereby to extract heat from the coils.

4. The stator according to claim 3, in which substantially all the supports define channels for the flow of the coolant therealong.

5. The stator according to claim 3, in which the non-magnetic material from which the supports are fabricated is non-metallic.

6. The stator according to claim 3, in which the supports provide support and cooling of the coils over substantially all of the linear conductor portions of the coils.

7. The stator according to claim 3, in which the coolant flow channels are defined internally of the supports.

8. The stator according to claim 7, in which the supports comprise hollow shells whose walls form boundaries of the channel, whereby, during operation of the machine, heat is conducted from the coils through the walls and into the coolant flowing through the supports.

9. The stator according to claim 3, and coolant inlet and outlet manifolds communicating with respective opposed ends of the channels to facilitate the flow of the coolant through the channels.

10. The stator according to claim 9, in which the coils include end windings to connect the linear conductor portions of the coils to each other, the end windings lying in the inlet and outlet manifolds so that the same coolant cools the end windings and the linear conductor portions of the coils.

11. The stator according to claim 3, in which the stator winding has two layers of the linear conductor portions of the coils, the two layers comprising respectively and radially inner layer and a radially outer layer.

12. The stator according to claim 11, in which the coils include end-windings which comprise connections between the two layers of the stator winding.

13. The stator according to claim 3, in which the linear conductor portions of the coils are provided by rectangular bundles of conductors, the rectangular bundles having their major dimensions extending in a radial direction.

14. The stator according to claim 13, in which the conductors within the bundles are of rectangular shape and are formed from small diameter wires, the wires being insulated from each other within the conductors.

15. An electrical motor or generator having a stator comprising:
   a) an outer annular laminated stator core coaxial with a longitudinal axis of the motor or generator,
   b) a stator winding inside the stator core and comprising a plurality of coils having linear conductor portions extending parallel to the longitudinal axis and stacked radially of the longitudinal axis, and
   c) a plurality of supports for the coils, the supports extending along the longitudinal axis alongside the linear conductor portions of the coils, the supports also tapering radially of the longitudinal axis to make intimate contact with the stacked linear conductor portions. the supports being fabricated from a non-magnetic material, and each support being interposed between, and in contact with, two adjacent ones of the linear conductor portions of the coils, at least some of the supports defining channels extending along the longitudinal axis for a flow of a coolant therealong, thereby to extract heat from the coils.

16. A stator for an air gap electrical machine, the stator comprising:
   a) an outer annular laminated stator core coaxial with a longitudinal axis of the machine,
   b) a stator winding inside the stator core and comprising a plurality of coils having linear conductor portions, and
   c) a plurality of supports for the coils, the supports extending alongside the linear conductor portions of the coils, the supports being fabricated from a non-magnetic material, and each support being interposed between, and in contact with, two adjacent ones of the linear conductor portions of the coils, at least some of the supports defining channels for a flow of a coolant therealong, the coolant flow channels being defined externally of the supports, thereby to extract heat from the coils.

17. The stator according to claim 16, in which the channels are defined between external surfaces of the supports and external surfaces of the coils, whereby, during operation of the machine, heat is transferred directly from the coils into the coolant flowing in the channels without passing through an intermediate wall.

18. The stator according to claim 17, which the linear conductor portions of the coils are supported from the supports through spacers provided between the supports and the linear conductor portions, the coolant channels having boundaries defined between the spacers and confronting faces of the linear conductor portions of the coils and the supports.

19. The stator according to claim 18, in which at least two of the channels are defined between each linear conductor portion and each adjacent support.

20. The stator according to claim 17, in which the channels comprise at least one depression in each coil-contacting surface of the support, the at least one depression extending longitudinally of the support, and boundaries of the coolant flow channels thereby being defined by depressed parts of the external surfaces of the supports and the external surfaces of the coils.

21. The stator according to claim 20, in which the depressions in the coil-contacting surfaces of the supports are of smoothly curved concave form when seen in a section which is transverse of their longitudinal extents.

22. A stator for an air gap electrical machine, the stator comprising:
   a) an outer annular laminated stator core coaxial with a longitudinal axis of the machine,
   b) a stator winding inside the stator core and comprising a plurality of coils having linear conductor portions, the stator winding having two layers of the linear conductor portions of the coils, the two layers comprising respectively a radially inner layer and a radially outer layer; and
   c) a plurality of supports for the coils, the supports extending alongside the linear conductor portions of the coils, the supports being fabricated from a non-magnetic material, and each support being interposed between, and in contact with, two adjacent ones of the linear conductor portions of the coils, at least some of the supports defining channels for a flow of a coolant therealong, thereby to extract heat from the coils, the two layers of the stator winding being keyed together at a castellated interface between two corresponding layers of the supports to provide mechanical strength.

23. The stator according to claim 22, in which the interface has castellations which comprise the supports having differing radial extents such that at least some of the supports in at least one of the layers extend between the linear conductor portions in the other of the layers.

24. A stator for an air gap electrical machine, the stator comprising:
   a) an outer annular laminated stator core coaxial with a longitudinal axis of the machine,
   b) a stator winding inside the stator core and comprising a plurality of coils having linear conductor portions, and
   c) a plurality of supports for the coils, the supports extending alongside the linear conductor portions of the coils, the supports being fabricated from a non-magnetic material, and each support being interposed between, and in contact with, two adjacent ones of the linear conductor portions of the coils, at least some of the supports defining channels for a flow of a coolant therealong, thereby to extract heat from the coils, the stator winding being keyed to the stator core at a castellated interface therebetween, and radially outer ends of at least some of the supports adjacent the stator core extending radially beyond the linear conductor portions of the coils into matching axially extending grooves provided in the stator core.

25. A stator for an air gap electrical machine, the stator comprising:
   a) an outer annular laminated stator core coaxial with a longitudinal axis of the machine,
   b) a stator winding inside the stator core and comprising a plurality of coils having linear conductor portions, and
   c) a plurality of supports for the coils, the supports extending alongside the linear conductor portions of the coils, the supports being fabricated from a non-magnetic material, and each support being interposed between, and in contact with, two adjacent ones of the linear conductor portions of the coils, at least some of the supports defining channels for a flow of a coolant therealong, thereby to extract heat from the coils, the supports comprising a fiber-reinforced composite material.

* * * * *